S. G. CRANE.
AUTOMATIC WEIGHING SCALE.
APPLICATION FILED MAR. 4, 1915.

1,360,186.

Patented Nov. 23, 1920.
7 SHEETS—SHEET 1.

Fig. 1.

WITNESSES:
D. C. Watter
Carl Ginke

INVENTOR.
Samuel G. Crane
BY George R. Frye
ATTORNEY

Fig. 4.

S. G. CRANE.
AUTOMATIC WEIGHING SCALE.
APPLICATION FILED MAR. 4, 1915.

1,360,186.

Patented Nov. 23, 1920.
7 SHEETS—SHEET 5.

WITNESSES:
D. C. Walter
Carl Pinke

INVENTOR.
Samuel G Crane
BY George R. Frye
ATTORNEY

S. G. CRANE.
AUTOMATIC WEIGHING SCALE.
APPLICATION FILED MAR. 4, 1915.

1,360,186.

Patented Nov. 23, 1920.
7 SHEETS—SHEET 7.

WITNESSES:
D. C. Walter
Carl Finke

INVENTOR.
Samuel G Crane
BY George R Frye
ATTORNEY

UNITED STATES PATENT OFFICE.

SAMUEL G. CRANE, OF TOLEDO, OHIO, ASSIGNOR TO TOLEDO SCALE COMPANY, OF TOLEDO, OHIO, A CORPORATION OF NEW JERSEY.

AUTOMATIC WEIGHING-SCALE.

1,360,186.  Specification of Letters Patent.  Patented Nov. 23, 1920.

Application filed March 4, 1915. Serial No. 11,966.

*To all whom it may concern:*

Be it known that I, SAMUEL G. CRANE, a citizen of the United States, residing at Toledo, in the county of Lucas and State of Ohio, have invented certain new and useful Improvements in Automatic Weighing-Scales, of which the following is a specification.

This invention relates to improvements in automatic weighing scales, and more particularly to that class of scales known as pendulum scales.

One object of this invention is to improve the structure and operation of pendulum scales.

Another object of this invention is to provide automatic means for indicating, recording, or indicating and recording the weight of an article weighed upon the scale after the article has remained upon the platform of the scale a predetermined length of time.

A further object of this invention is to provide in connection with the load-offsetting mechanism of the scale electrical connections and mechanisms arranged to be actuated when a load is placed upon the scale platform, and designed to operate timing mechanism for allowing a predetermined length of time in which the load-offsetting mechanism may reach a steady or balanced position, and then to operate means for indicating, recording, or indicating and recording the weight of the load.

A further object of this invention is to provide improved electric structures and mechanisms expressly adapted for use in contion with a scale of this character, and which have been found to successfully demonstrate the capabilities of this automatic scale.

With the above and other objects in view, which will readily appear from the following description, my invention consists in the novel construction, combination, and arrangement of parts, to be hereinafter more fully described, illustrated in the accompanying drawings, and particularly pointed out in the subjoined claims.

Reference is to be had to the accompanying drawings, illustrating preferred embodiments of my invention, and wherein similar reference numerals designate similar parts throughout the several views.

The framework of the scale comprises the base 5 having columns 6 arranged at the rear corners thereof and supporting a crossbar 7. The scale platform 8 is suitably supported upon platform levers arranged within the base 5 and which connect with the hook-rod 9 extending upwardly within one of the columns 6, the upper end of the hook-rod connecting with the U-shaped yoke 10, the upper ends of which engage knife-edge pivots 12 carried upon the rocker frame 11. The platform lever mechanism may be of any desired construction, several types of mechanisms well known in the scale art being fully capable of performing the desired functions.

Figure 4:
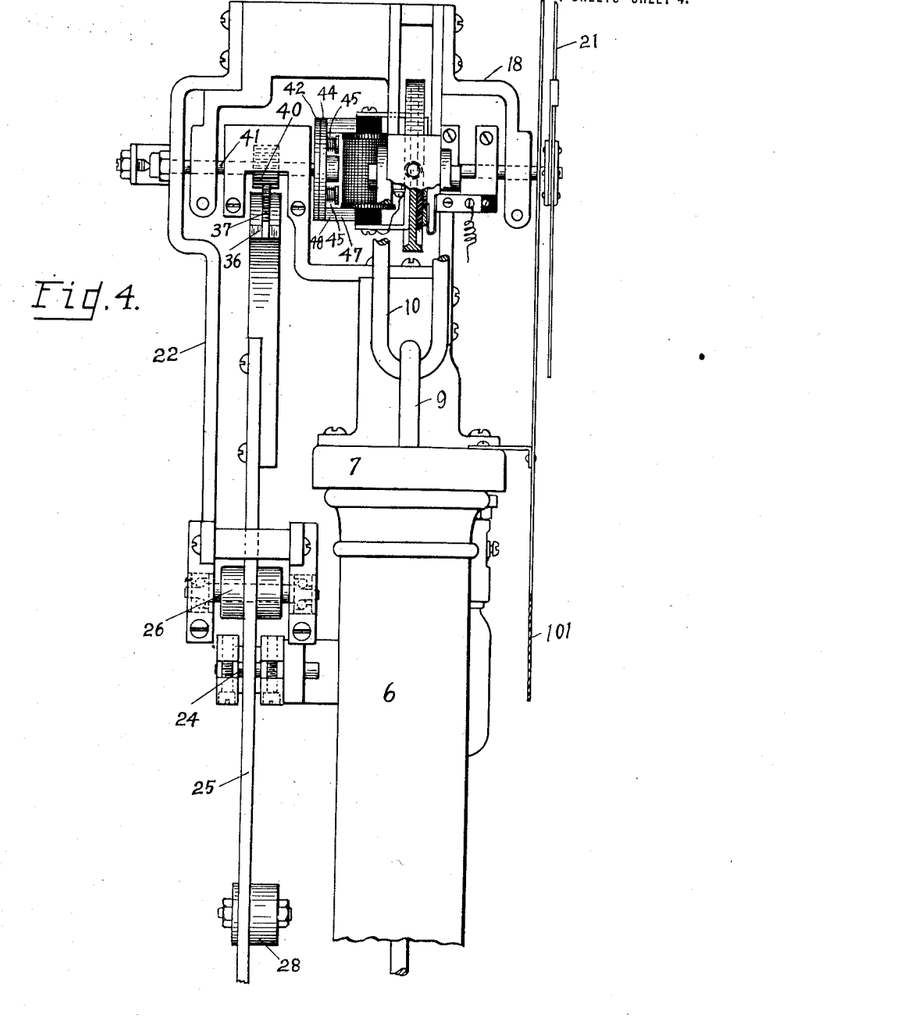
Fig. 4 is an enlarged detail view showing in side elevation the upper portion of the scale and the indicating mechanism.
Figure 5:
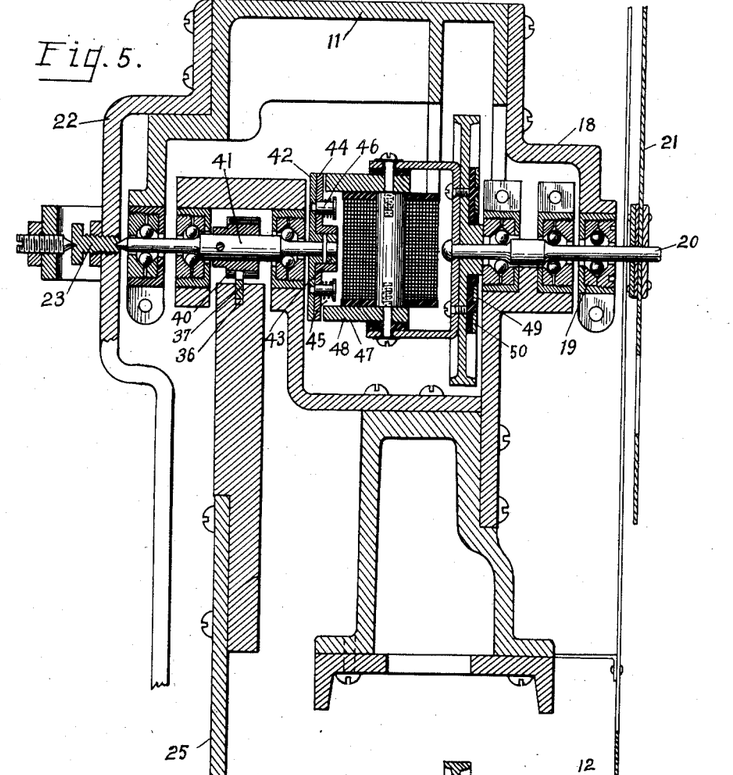
Fig. 5 is an enlarged vertical sectional view taken substantially on the line 5—5 of Fig. 2.

The rocker-frame 11 comprises a curved central portion having oppositely extending arms at the ends thereof, one of said arms carrying the knife-edge pivots 12 hereinbefore referred to and an adjustable weight 13 that may be employed in the sealing of the scale. Connected to the other arm of the rocker frame is an elongated rod 14, screw threaded intermediate its ends to receive a second adjustable sealing weight 15, the other end of which is pivotally connected to the stem 16 of the dash pot 17 arranged to dampen the movements of the rocker frame 11. Secured upon the forward surface of the curved portion of the rocker frame 11, at substantially the central point thereof, is a bracket arm 18 in which is provided an anti-friction bearing 19 adapted to bear upon the shaft 20 the forward end of which carries the indicator hand 21. The arm 22 is secured to the rear surface of the rocker-frame 11 substantially centrally of the curved portion thereof and carries, intermediate its ends, the adjustable bearing 23, adapted to be mounted upon cone-shaped bearings carried by the framework of the scale, as clearly seen in Fig. 5. the lower end of the arm 22 being extended in a downward direction to a point adjacent the fulcrum 24 of the pendulum stem 25, being pivotally secured, as at 26, (see Fig. 4) to the pendulum stem at a point above the fulcrum 24. The load-offsetting pendulum comprises an elongated stem 25, which for the sake of lightness may be provided with apertures 27 in which may be placed supplementary balance weights 28 (see Fig. 4) should it be found necessary, the stem 25 being fulcrumed, intermediate its ends, upon the free end of a horizontally disposed fulcrum rod 29, the opposite end of which is pivoted, as at 30, upon a crossbar 31 extending between the columns 6 of the framework of the scale. (See Figs. 2 and 3).

By thus pivoting the pendulum upon a fulcrum rod provision is made for allowing the connection 26 from the arm 22 to travel through an extensive arc.

Figure 1:
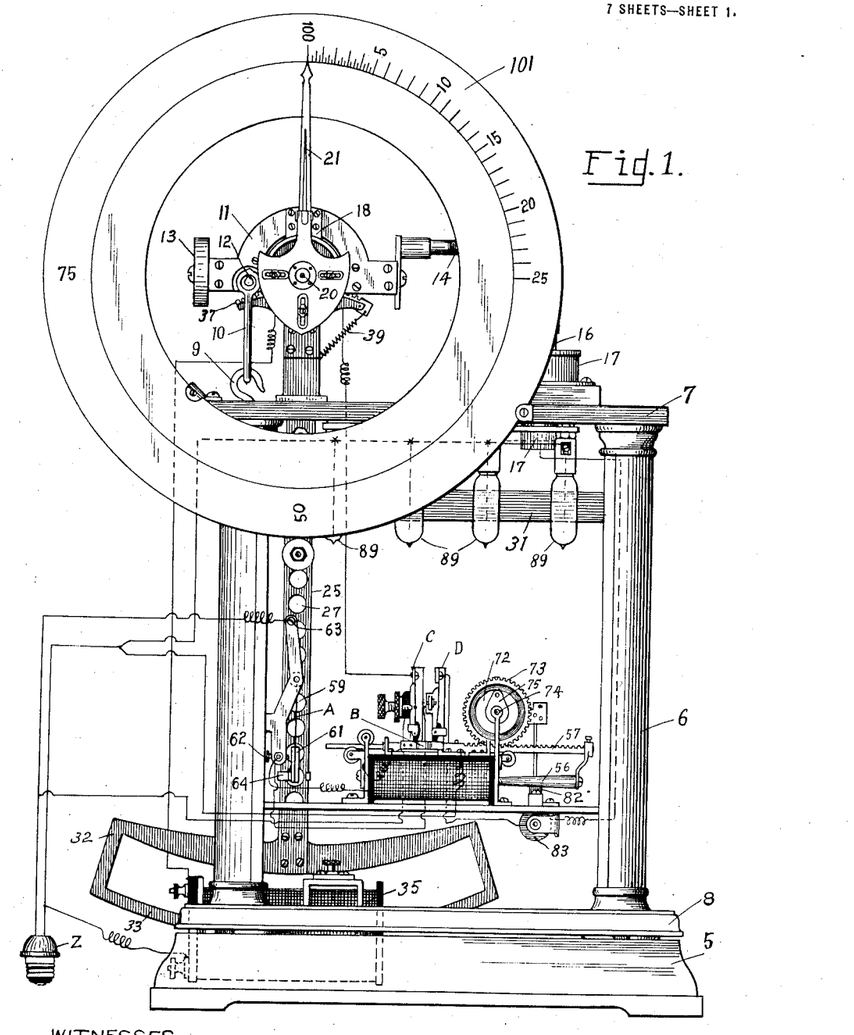
Figure 1 is a front elevation of a scale embodying my invention, the several mechanisms of the scale being shown in their normal positions—*i. e.*, as they would appear when no load is imposed upon the scale platform.
Figure 2:
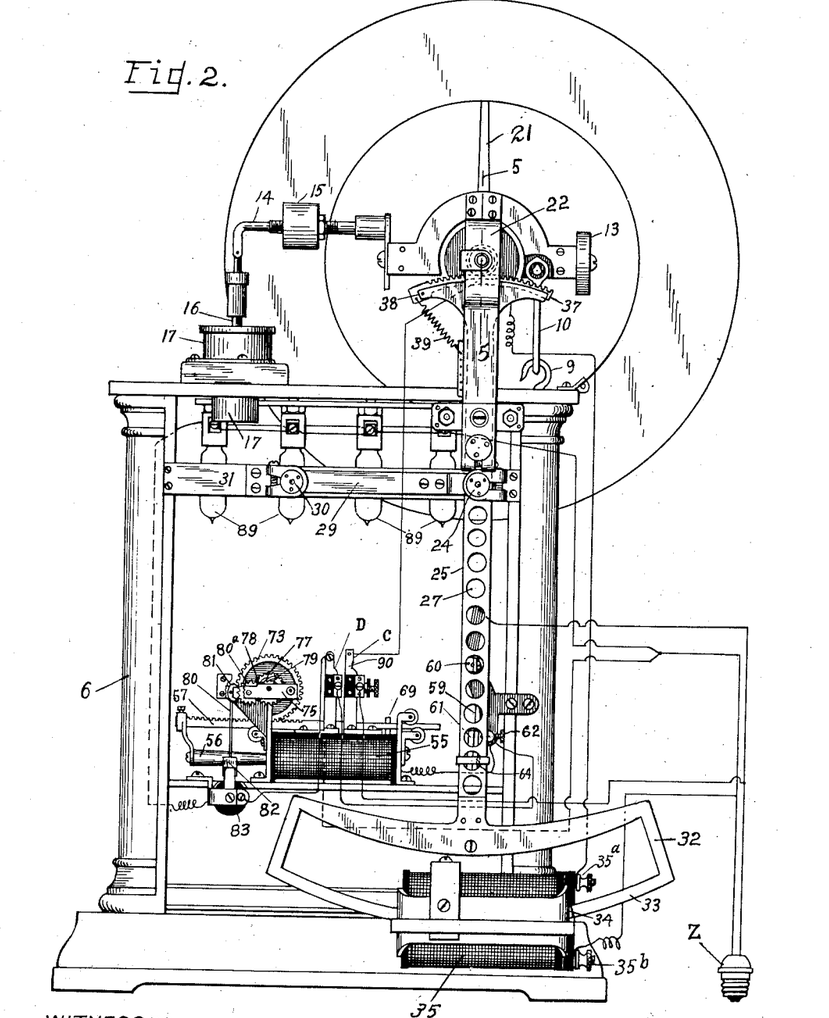
Fig. 2 is a rear elevation of the scale shown in Fig. 1.
Figure 3:
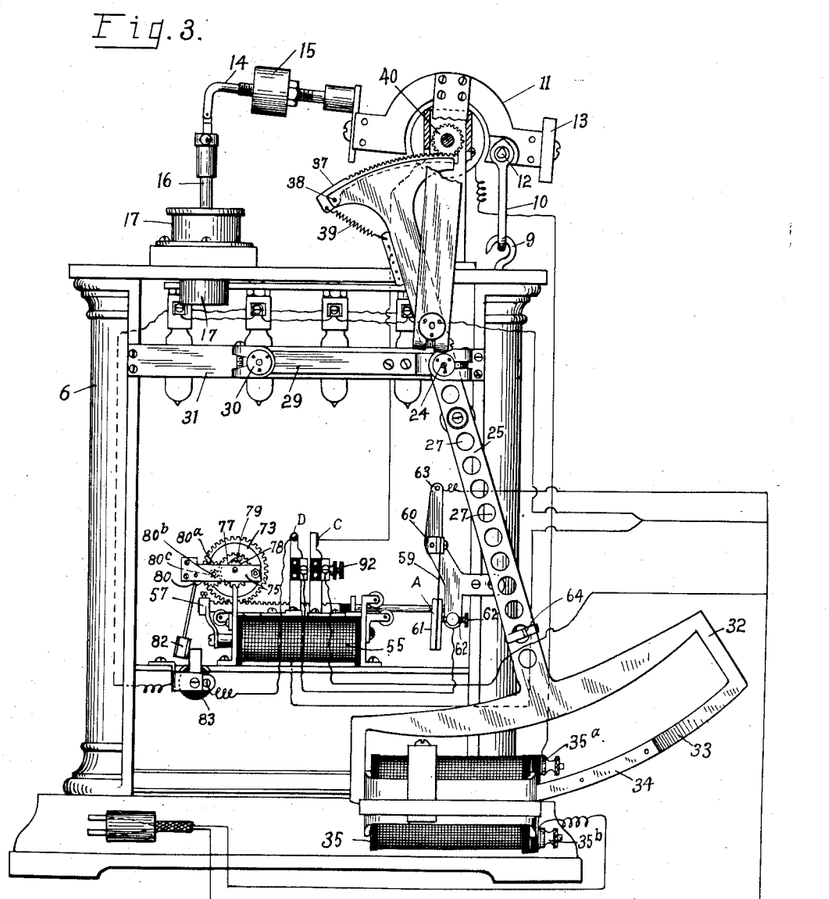
Fig. 3 is a view similar to Fig. 2 but showing the scale as it would appear with a heavy load upon the scale platform.

The lower end of the pendulum stem carries a frame 32 of brass, aluminum, or other non-magnetic material, the lower portion of the frame being curved, substantially as shown in Figs. 1–3, and carrying intermediate its ends the soft iron weight 34 which is mounted to float or move freely within the solenoid coil 35 secured upon the rear portion of the base 5 of the scale. At its upper end the pendulum stem is widened and bifurcated as shown at 36 in Figs. 4 and 5, a segmental rack 37 being arranged between the bifurcations and pivotally connected adjacent one end thereto, as shown at 38 in Figs. 2 and 3, a spring 39 secured to one end of the rack 37 serving to hold the segmental rack in close engagement with the pinion 40 affixed upon the shaft 41 suitably mounted upon anti-friction bearings carried by the framework of the scale, and which carries upon its forward extremity the disk 42, which may be of brass or other non-magnetic material, upon the hub 43 of which is loosely mounted the soft iron disk 44 which is slidable upon the hub 43 and normally held in engagement with the disk 42 by springs 45 mounted upon headed studs 46 carried by the disk 42 and extending through apertures in the disk 44, as clearly shown in Fig. 5.

That portion of the scale hereinbefore described substantially comprises the load-offsetting mechanism illustrated in the embodiments of the scale herein shown and operates substantially as follows:

The pendulum stem 25 being substantially in a vertical position, as shown in Figs. 1 and 2, when a weight is placed upon the platform 8 of the scale a pull is exerted through the hook-rod and the yoke 10 tending to rock the rocker-frame 11 upon its bearings, the elongated arm 22 of the bracket rocking therewith and tending to swing the upper portion of the pendulum stem 25 substantially into the position shown in Fig. 3, the fulcrum 24 of the pendulum stem swinging slightly through the arc described with the pivoted rod 29 as a radius and its fixed pivotal point 30 as a center, the lower portion of the pendulum being displaced substantially as shown in Fig. 3 of the drawings until it has reached a position counter-balancing the weight of the load upon the scale platform. During its travel the upper portion of the pendulum carrying the segmental rack 37 rotates the pinion 40 and the disks 42 and 44 through an arc proportionate to the displacement of the pendulum. It will be noted, however, that this rotation of the disks 42 and 44 does not affect any movement of the indicating or recording mechanism.

Figure 8:
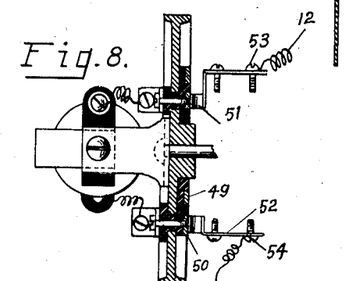
Fig. 8 is a detail sectional view showing the wiring connections for energizing the magnetic clutch hereinafter described.

Mounted upon the rear extremity of the shaft 20 carrying the indicating hand 21 (see Fig. 5) is a magnetic clutch 47, the pole-pieces 48 of which extend into positions adjacent the forward surface of the soft iron disk 44. Electric current is supplied to the magnetic clutch 47 through inner and outer rings 49 and 50 respectively, which are contacted by stationary brushes 51 and 52 respectively suitably secured upon the framework of the scale and provided with binding screws 53 and 54 respectively for connection with the electric wires (see Fig. 8).

The timing mechanism employed to space the operation of the indicating or indicating and recording mechanism until such a time as the pendulum has ceased oscillating and vibrating and has reached a steady or balanced position will now be described. A solenoid coil 55 is arranged on the base of the scale adjacent the rear thereof and when energized upon the closing of the electric circuit as hereinafter described attracts and draws in the tapered core 56 which has attached thereto the horizontally-disposed rack 57, the movement of the core within the coil 55 serving to advance the rack 57 to substantially the position shown in Fig. 3 of the drawings. The electrical connections whereby the solenoid 55 is energized upon the placing of an article upon the scale platform are as follows: a switch A comprising a flexible leaf spring 59 suspended at its upper portion from the bracket 60 carried by the framework of the scale, see Figs. 2 and 3, and a weight 61 on the lower end of the spring 59 tending to hold the flexible spring in a straight line position, the contact screw 62 being suitably arranged to be contacted by the weight 61 whenever the spring A hangs in a vertical or straight line position, an electrical connection being made through the spring 59 and weight 61 and portions of the bracket 61, the binding screw 63 upon the bracket 61 being provided to receive an electric wire, as clearly shown in Fig. 3.

Whenever the load-offsetting pendulum hangs in its normal position—i. e., when no load is upon the scale platform—a projection 64 extends from the pendulum stem (see Fig. 1) and contacts with the weight 61, forcing the weight away from the contact screw 62, thereby normally maintaining the switch A open. However, immediately upon movement of the pendulum stem 25 in offsetting a load upon the scale platform the projection 64 is removed from its position engaging the weight 61, and the weight 61 swings into contact with the contact screw 62, completing the circuit to energize the solenoid coil 55. This switch A may be termed a line-switch inasmuch as the current cannot pass into the several circuits of the scale until after the closing of the switch A and in the majority of the several scale circuits the switch A is a component part. The circuit for energizing the timing solenoid 55 leads from the plug Z, connecting with the source of energy, through the switch A (when closed) to a second switch B which is arranged above and at one side of the solenoid coil (see Figs. 6 and 7), thence to and through the solenoid coil 55 and back to the plug Z. The switch B comprises a fixed, curved portion 65 having spring prongs 66 arranged to contact a slidable conducting arm 67 secured to the horizontally-movable rod 68, which rod is held in position and guided in its movements by slotted brackets 69. When the scale is in normal position the switch B is closed, the slidable conducting arm 67 contacting the prongs 66, the rack 57 and slidable rod 68 being then substantially in the positions shown in Figs. 1 and 2, thereby allowing the circuit for energizing the solenoid coil 55 to be completed immediately upon contact of the weight 61 with the contact screw 62 upon movement of the pendulum stem. When, however, upon the energization of the solenoid coil the tapered core 56 with the rack 57 is drawn within the solenoid coil to substantially the position shown in Fig. 3, a laterally-extending lug 70 carried by the rack 57 (see Fig. 7) engages the laterally-projecting lug 71 upon the slidable rod 68 and slides the rod 68 forward so that its conducting arm 67 is separated from the spring prongs 66 of the fixed portion 65 of the switch B, thereby breaking the circuit which energized the coil 55 and removing the attractive force serving to advance the tapered core 56, leaving this core 56 and its attached rack 57 free to return to its original or normal position under the influence of the spring-actuated mechanical timer 72. The mechanical timer 72 comprises a gear wheel 73 meshing with the horizontally-disposed rack 57 and mounted upon the stub shaft 74 in the bracket 75 suitably supported upon the base of the scale, a spring 76 being secured at its outer end to the gear-wheel 73 and at its inner end to a fixed portion of the bracket 75 so that the rotation of the gear-wheel 73 during the advance movement of the rack (when the tapered core 56 is drawn within the solenoid coil 55) serves to wind the spring 76, increasing its power to rotate the gear wheel 73 to force the return of the rack 57 and the core 56 to their normal positions. On the shaft 74 which carries the gear-wheel 73 is secured a ratchet wheel 78 which co-acts with the pawl 79 pivoted upon a small-gear wheel 77 loosely surrounding the shaft 74, the pawl 79 being arranged so as to allow the free rotation of the ratchet wheel 78 during the forward movement of the rack 57, but to fall in position to engage the ratchet teeth so as to compel the simultaneous movement of the several gear-wheels during the return movement of the rack 57. The rapidity of the rotation of the gear wheels and consequently of the return movement of the rack 57 is governed by a pendulum escapement mechanism 80 coöperating with a star-wheel $80^a$ affixed on a shaft $80^b$ parallel to the shaft 74, the elongated toothed hub $80^c$ of the star-wheel meshing with the small gear-wheel 77.

The pendulum escapement 80 comprises a pendulum stem suitably pivoted upon the bracket 75 and carrying the escapement lever 81 adjacent its upper extremity, a weight 82 of soft iron or other magnetic material being provided at the lower extremity of the pendulum stem. The soft iron weight 82 of the pendulum oscillates between the pole-pieces of and within the magnetic field created by the electro-magnet 83 secured upon the framework of the scale adjacent this pendulum weight, and so arranged and constructed that whenever the electro-magnet 83 is energized the soft iron weight 82 will be attracted to a position such as shown in Fig. 2 of the drawings, the pendulum stem being then in a straight line position, and the weight 82 between the pole-pieces of the magnet. The strength of the magnetic attraction is sufficient to hold the weight 82 and the pendulum against oscillation as long as the electro-magnet 83 is energized.

Figure 6:
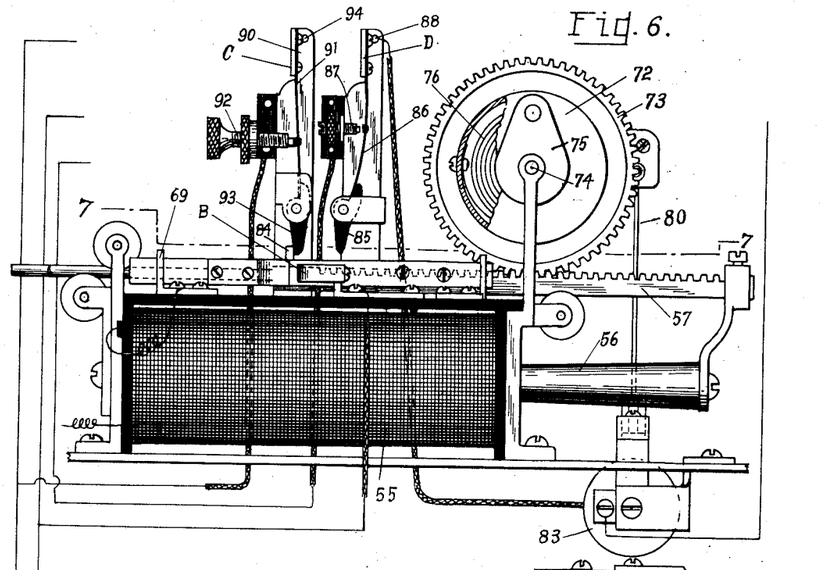
Fig. 6 is an enlarged detail elevation of the timing mechanism and associated parts.
Figure 7:
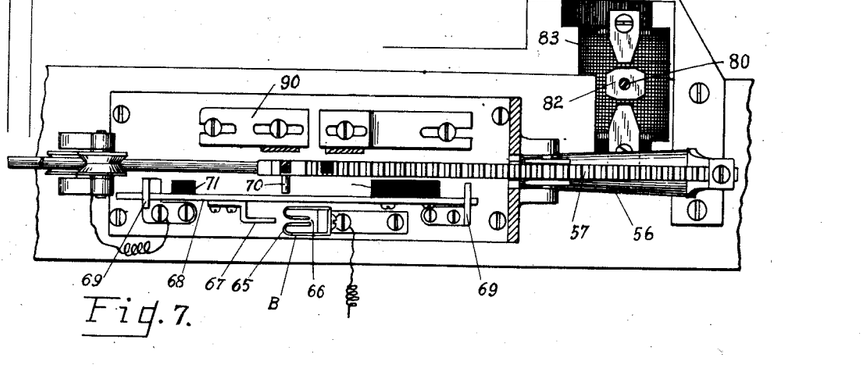
Fig. 7 is a detail plan view taken substantially on the line 7—7 of Fig. 6.

The circuit whereby the electro-magnet 83 is energized includes a switch D arranged above the solenoid coil 55, see Figs. 1 and 6, this switch being normally open, and adapted to be closed at the desired time by means of an upwardly-extending lug 84 upon the rack 57 which is arranged to trip the switch-throwing lever 85 which is formed of insulating material and suitably pivoted between its ends so that the lower arm thereof extends within the path of travel of the lug 84, and its upper arm is arranged in position to force the leaf spring switch member 86 into contact with the adjustable contact screw 87 whenever the lower arm of the switch-throwing lever 85 is contacted by the lug 84 during the return movement of the rack 57 to its original or normal position. The switch-throwing lever 85, as is clearly shown in Fig. 6, is pivoted so that the contact of the lower arm of the switch by the lug 84 during the forward movement of the rack 57 will not affect the movement or position of the leaf spring switch member 86. Extending from the binding screw 88 secured to the bracket supporting the leaf spring switch member 86 and from the adjustable contact screw 87, the electric wires of the circuit connect with the electro-magnet 83 and with the switch A respectively, one wire continuing from the switch A to the plug Z arranged to connect with the source of current, and the other continuing from the electro-magnet 83 to the series of electric lamps 89, then returning to the plug Z to complete the circuit. The lamps 89 are illustrated merely to represent illuminating means whereby it is possible to illuminate the working parts of the scale, or whereby a directive, advertising, or other interest-exciting sign or signs may be illuminated. It is to be understood that the lamps 89 need not be arranged in the position shown in the drawings but may be placed wherever they may prove to be advantageous, whether the position be on the scale, or detached therefrom. It is believed to be apparent from this illustrative embodiment that since arrangements can readily be made as herein shown whereby the current may be supplied to the lamps 89, such or similar arrangements will suffice to illumine any advertising or other interest-exciting sign arranged on or in the neighborhood of the scale.

In the operation of the scale when an article is placed upon the platform of the scale, the pendulum will be displaced to counter-balance the weight of the article, the movement of the pendulum allowing the switch A to close, substantially as hereinbefore described, the closing of the switch A completing a circuit through the switch B whereby the solenoid coil 55 is energized to attract and draw in the tapered core 56, thereby advancing the rack 57 to the position shown in Fig. 3 of the scale, this forward movement of the rack 57 opening the switch B and breaking the circuit, the solenoid 55 being thereby deënergized. Upon the deënergization of the solenoid coil 55, the rack 57 and the tapered core 56 will gradually be returned to their original positions under the influence of the spring-actuated mechanical timer 72, the oscillation of the pendulum 80 with its escapement lever 81 governing the rapidity of this return movement. The first operation effected during the return movement of the rack 57 is the closing of the switch C (see Fig. 7) to energize the solenoid coil 35. This switch C includes a bracket 90 suitably secured above the solenoid coil 55, and adjustable so that its position relatively to the end of the solenoid coil may be altered as desired, the bracket supporting the upper end of the leaf spring switch member 91, which is normally spaced from the adjustable contact screw 92 and arranged to be moved into contact therewith upon movement of the upper arm of the switch-throwing lever 93 which is formed of insulating material and pivoted intermediate its ends upon the bracket 90 substantially as is the switch-throwing lever 85 hereinbefore described, the lower arm of the lever 93 extending downwardly into the path of travel of the upwardly-extending lug 84 upon the rack 57. This switch-throwing lever 93 like the switch-throwing lever 85 is mounted so that its contact by the lug 84 during the forward travel of the rack 57 will not affect the position of the leaf spring switch member 91, but when contacted by the lug 84 during the return movement of the rack 57 will be swung so as to force the switch member 91 into contact with the contact screw 92.

The circuit including the switch C is in the nature of an independent circuit—$i. e.$, it does not receive its current through the line switch A as do the other circuits employed in connection with the operation of this scale—and extends from the plug Z or source of current to the contact screw 92 thence through the leaf spring switch member 91 to the binding screw 94 connected with the switch member 91, the wire of the circuit extending therefrom to the magnetic clutch 47, being there secured to the binding posts 53 and 54 and extending therefrom to the binding post $35^a$ of the solenoid coil 35, through the solenoid coil, and thence from the binding post $35^b$ back to the plug Z and source of current.

When during the return travel of the rack 57 the lug 84 contacting with the switch-throwing lever 93 closes the circuit including the switch C the solenoid coil 35 will be energized to attract the soft iron weight 34 carried by the lower portion of the load-offsetting pendulum and draw the weight 34 within the solenoid, thereby returning the pendulum to its normal or original position. Preferably a suitable stop is arranged to prevent the carriage of the pendulum beyond its normal position during its return movement.

Figure 9:
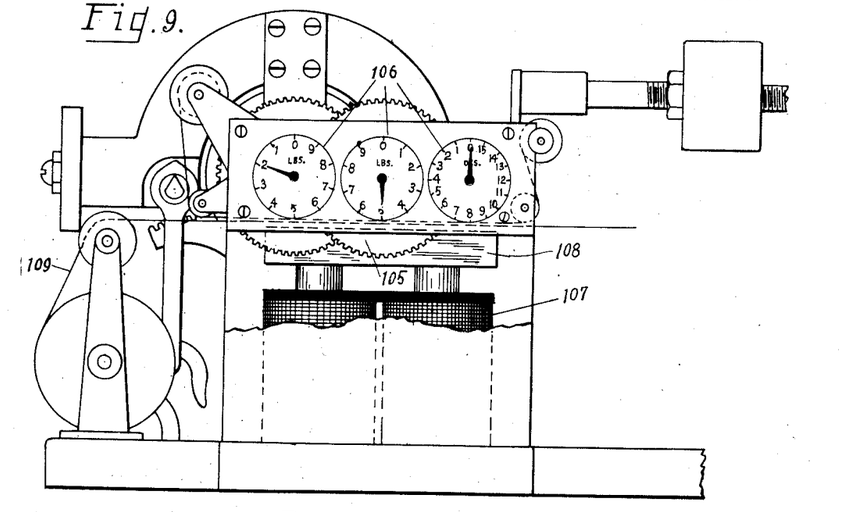
Fig. 9 is a front elevation of one form of indicating and recording mechanism that may be employed in connection with this invention.
Figure 10:
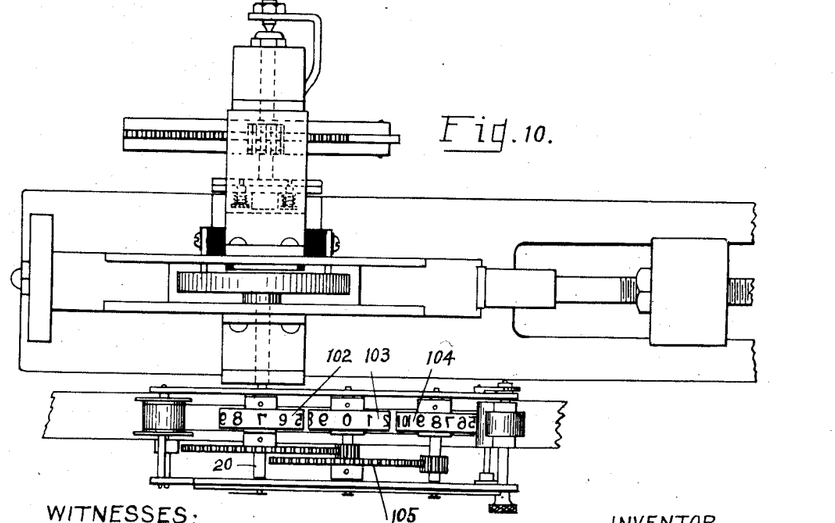
Fig. 10 is a plan view of the mechanism shown in Fig. 9.

Simultaneously with the energizing of the solenoid 35 the magnetic clutch 47 will be energized and the pole-pieces 48 thereof will attract and firmly hold the soft iron disk 44 so that when the pendulum is returned to its normal or original position as above described the magnetic clutch 47 will be rotated through a sufficient arc to indicate through the shaft 20 and the pointer 21 the weight of the article upon the scale platform. This rotation of the shaft 20 by means of the turning of the magnetic clutch 47 will serve to correctly indicate the weight on the scale platform, inasmuch as the disk 44 having been previously rotated in conjunction with the disk 42 and the pinion 40 by the displacement of the pendulum in its load-offsetting movement will now traverse the same arc in returning from this adjusted position to its original or normal position, and the clutch 47 with the attached shaft 20 and the pointer 21 will be rotated this same distance during the return movement of the disk 44. Further, this rotation of the shaft 20 impelled by the returning of the pendulum from its displaced counterbalanced position to its normal position may be utilized to actuate indicating mechanism, such as the pointer 21 acting in conjunction with the chart 101, or it may be utilized to actuate recording mechanism whereby the weight of the article may be printed, perforated, or otherwise recorded upon a strip of paper, etc., or indicating and recording means may be simultaneously actuated. One example of an indicating and recording mechanism is shown in Figs. 9 and 10 of the drawings wherein a plurality of printing or type disks 102, 103, and 104 are appropriately arranged to be rotated upon the rotative movement of the shaft 20, a train of gears 105 being provided to suitably rotate the printing disks the requisite number of times to record ounces, pounds, and tens of pounds by the disks 104, 103, and 102 respectively. Indicator hands may be provided upon the several shafts supporting the printing disks to coöperate with the charts 106 in indicating the weights recorded. While no attempt has been made to illustrate a complete operative recording means, the solenoids 107 (see Fig. 9) may be employed to actuate a platen 108 to press the strip 109 of paper or similar material against the type disks 102, 103, and 104 after these disks have been rotated to bring the appropriate numerals in position above the paper strip. It is to be understood that any suitable mechanism for recording, or indicating and recording, may be utilized in connection with the scale herein shown, the illustrated embodiment being only by way of illustration, it being manifest from the embodiments herein illustrated that means are provided for appropriately setting in rotation the movable parts of an indicating mechanism, a recording mechanism, or a combined indicating and recording mechanism.

It will be apparent from the above description that means have been provided whereby a pendulum mechanism suitably supported from the framework of the scale is displaced sufficiently to counterbalance or offset the weight of an article or articles placed upon the scale platform, and that upon the movement of the pendulum in its load-offsetting capacity electrical connections and mechanisms are brought into play whereby a certain length of time wherein the pendulum is allowed to cease vibrating and oscillating and reach a steady or balanced position is measured, after which other electrical connections and mechanism are brought into play to return the pendulum to its normal position and operate an indicating mechanism, or an indicating and recording mechanism, all as hereinbefore described.

It is also believed to be apparent from the foregoing that after the operation of the indicating mechanism, connections are made whereby further electrical connections and mechanisms are brought into play to stop the operation of the timing mechanism and illuminate an advertising or other interest-exciting sign arranged on or in the neighborhood of the scale, which electrical mechanism will remain in operation until such a time as the article or articles being weighed are removed from the scale platform.

It is to be further understood that the specific mechanisms herein shown for accomplishing the several purposes mentioned are illustrated only by way of exemplification and that many other forms, modifications, and structures may be resorted to without departing from the spirit of the invention. The scope of my invention is defined in the claims hereinafter set forth in such terms as to distinguish it from the prior art so far as known to me, though it is not my intention to relinquish or abandon any portion of the invention.

Having described my invention, I claim:

1. In a scale, mechanical load-offsetting means, and electrically-actuated means for indicating the weight of the load after a predetermined length of time, the latter means including electrically-actuated means for delaying the operation of the indicating mechanism until the load-offsetting means has reached a steady or balanced position.

2. In a scale, the combination of load-offsetting means, timing mechanism actuated upon movement of the load-offsetting means for allowing the load-offsetting means to reach a balanced position, electrically-actuated means for setting the timing mechanism in motion upon movement of the load-offsetting means, indicating means, and means controlled by the timing mechanism for connecting the indicating means with the load-offsetting means after a predetermined time has elapsed.

3. In a scale, the combination of load-offsetting means, timing mechanism actuated upon movement of the load-offsetting means for allowing the load-offsetting means to reach a balanced position, electrically-actuated means for setting the timing mechanism in motion upon movement of the load-offsetting means, electrically-actuated indicating means, and means controlled by the timing mechanism for connecting the indicating means with the load-offsetting means after a predetermined time has elapsed.

4. In a scale, the combination of load-offsetting means including a pendulum, timing mechanism actuated upon movement of the pendulum for allowing the pendulum to reach a balanced position, electrically-actuated means for setting the timing mechanism in motion upon movement of the load-offsetting means, indicating means, and means controlled by the timing mechanism for connecting the indicating means with the load-offsetting means after a predetermined time has elapsed.

5. In a scale, the combination of displaceable load-offsetting means, means for automatically returning the load-offsetting means to its normal position after a predetermined length of time, indicating means and means for connecting said indicating means with said load-offsetting means so as to be actuated thereby upon such return movement.

6. In a scale, the combination of displaceable load-offsetting means, electrical means for returning the load-offsetting means to its normal position after a predetermined length of time, indicating means and means for connecting said indicating means with said load-offsetting means so as to be actuated thereby upon such return movement.

7. In a scale, the combination of displaceable load-offsetting means, electrical means for returning the load-offsetting means to its normal position after a predetermined length of time, and means for setting said electrical means into operation upon the displacement of the load-offsetting means.

8. In a scale, the combination of displaceable load-offsetting means, and electrical means for returning the load-offsetting means to its normal position after a predetermined length of time, including a switch closed upon the displacement of the load-offsetting means.

9. In a scale, weighing mechanism including a pendulum adapted to be moved from its normal position in counterbalancing a load, indicating means inactive during the counterbalancing operation and means whereby the indicating means is connected to the weighing mechanism to be actuated by the return movement of the pendulum to its normal position.

10. In a scale, weighing mechanism including a pendulum adapted to be moved from its normal position in counterbalancing a load, electrically-actuated indicating means inactive during the counterbalancing operation and means whereby the indicating means is connected to the weighing mechanism to be actuated by the return movement of the pendulum to its normal position.

11. In a scale, weighing mechanism including a pendulum adapted to be moved from its normal position in counterbalancing a load, electrical means for returning the pendulum to its normal position, indicating means, and means for connecting said indicating means with said weighing mechanism so as to be actuated thereby upon such return movement.

12. In a scale, weighing mechanism including a pendulum adapted to be moved from its normal position in counterbalancing a load, means for automatically returning the pendulum to its normal position, indicating mechanism, and means for connecting said indicating mechanism with said weighing mechanism so as to be actuated thereby upon such return movement.

13. In a scale, weighing mechanism including a pendulum adapted to be moved from its normal position in counter-balancing a load, electrical means for returning the pendulum to its normal position after a predetermined length of time set in operation upon the advancement of the pendulum, indicating means, and means for connecting said indicating means with said weighing mechanism so as to be actuated thereby upon such return movement.

14. In a scale, weighing mechanism including a pendulum adapted to be moved from its normal position in counter-balancing a load, electrical means for returning the pendulum to its normal position after a predetermined length of time, including a switch closed upon the advance movement of the pendulum, indicating mechanism and means for connecting said indicating mechanism with said weighing mechanism so as to be actuated thereby upon such return movement.

15. In a scale, load-offsetting means including a pendulum, electrically-actuated timing mechanism and means for energizing said timing mechanism upon movement of the pendulum, including connections whereby the operation of the timing mechanism is stopped after a predetermined length of time.

16. In a scale, weighing mechanism including a pendulum, electrically-actuated timing mechanism energized upon movement of the pendulum, indicating mechanism, means for connecting said indicating mechanism with said weighing mechanism so as to be actuated thereby after a predetermined operation of the timing mechanism, and connections whereby the operation of the timing mechanism is stopped after the operation of the indicating mechanism.

17. In a scale, weighing mechanism including a pendulum, electrically-actuated timing mechanism energized upon movement of the pendulum, electrically-actuated indicating mechanism, means for connecting said indicating mechanism with said weighing mechanism so as to be actuated thereby after a predetermined operation of the timing mechanism, and connections whereby the operation of the timing mechanism is stopped after the operation of the indicating mechanism.

18. In a scale, weighing mechanism including a pendulum, electrically-actuated timing mechanism including a switch closed upon movement of the pendulum, electrically-actuated indicating mechanism, means for connecting said indicating mechanism with said weighing mechanism so as to be actuated thereby after a predetermined operation of the timing mechanism, and connections whereby the operation of the timing mechanism is stopped after the operation of the indicating mechanism.

19. In a scale, the combination of load-offsetting means, timing mechanism actuated upon movement of the load-offsetting means for allowing the load-offsetting means to reach a balanced position, electrically-actuated means for setting the timing mechanism in motion upon movement of the load-offsetting means, indicating and recording means, and means for connecting said indicating and recording means with said load-offsetting means so as to be actuated thereby after a predetermined action of the timing mechanism.

20. In a scale, the combination of load-offsetting means, automatic timing mechanism actuated upon movement of the load-offsetting means for allowing the load-offsetting means to reach a balanced position, electrically-actuated means for setting the timing mechanism in motion upon movement of the load-offsetting means, indicating and recording means, and means for connecting said indicating and recording means with said load-offsetting means so as to be actuated thereby after a predetermined action of the timing mechanism.

21. In a scale, the combination of load-offsetting means, timing mechanism actuated upon movement of the load-offsetting means for allowing the load-offsetting means to reach a balanced position, electrically-actuated means for setting the timing mechanism in motion upon movement of the load-offsetting means, electrically-actuated indicating and recording means, and means for connecting said indicating and recording means with said load-offsetting means so as to be actuated thereby after a predetermined action of the timing mechanism.

22. In a scale, the combination of load-offsetting means including a pendulum, timing mechanism actuated upon movement of the pendulum for allowing the pendulum to reach a balanced position, electrically actuated means for setting the time mechanism in motion upon movement of the load-offsetting means, indicating means, and means for connecting said indicating means with said load-offsetting means so as to be actuated thereby after a predetermined action of the timing mechanism.

23. In a scale, the combination of displaceable load-offsetting means, means for automatically returning the load-offsetting means to its normal position after a predetermined length of time, indicating and recording means, and means for connecting said indicating and recording means with said load-offsetting means prior to the return movement thereof so as to be actuated thereby.

24. In a scale, the combination of displaceable load-offsetting means, electrical means for automatically returning the load-offsetting means to its normal position after a predetermined length of time, indicating and recording means, and means for connecting said indicating and recording means with said load-offsetting means prior to the return movement thereof so as to be actuated thereby.

25. In a scale, weighing mechanism including a pendulum adapted to be moved from its normal position in counterbalancing a load, indicating and recording means inactive during the counter-balancing operation and means whereby the indicating and recording means are connected to the weighing mechanism to be actuated by the return movement of the pendulum to its normal position.

26. In a scale, weighing mechanism including a pendulum adapted to be moved from its normal position in counterbalancing a load, electrically-actuated indicating and recording means inactive during the counter-balancing operation and means whereby the indicating and recording means are connected to the weighing mechanism to be actuated by the return movement of the pendulum to its normal position.

27. In a scale, weighing mechanism including a pendulum adapted to be moved from its normal position in counter-balancing a load, electrical means for returning the pendulum to its normal position after a predetermined length of time set in operaton upon the movement of the pendulum, indicating and recording mechanism, and means for connecting said indicating and recording mechanism with said weighing mechanism so as to be actuated thereby upon such return movement.

28. In a scale, weighing mechanism including a pendulum, electrically-actuated timing mechanism energized upon movement of the pendulum, indicating and recording mechanism, means for connecting said indicating and recording mechanism with said weighing mechanism so as to be actuated thereby after a predetermned operation of the timing mechanism, and connections whereby the operation of the timing mechanism is stopped after the operation of the indicating and recording mechanism.

29. In a scale, weighing mechanism including a pendulum, electrically-actated timing mechanism including a switch closed upon movement of the pendulum, indicating and recording mechanism, means for connecting said indicating and recording mechanism with said weighing mechanism so as to be actuated thereby after a predetermined operation of the timing mechanism, and connections whereby the operation of the timing mechanism is stopped after the operation of the indicating and recording mechanism.

30. In a scale, load-offsetting means comprising a pendulum having a weighted frame adapted to be moved from its normal position in counter-balancing a load, and means exerting a magnetic pull upon said weighted frame for returning the same to its normal position, said means being set in operation by the movement of the pendulum.

31. In a scale, load-offsetting means comprising a pendulum having a weighted frame adapted to be moved from its normal position in counter-balancing a load, and electrical means acting upon said weighted frame for returning the same to its normal position, and means being set in operation by the movement of the pendulum.

32. In a scale, load-offsetting means comprising a pendulum, a frame of non-magnetic material carried thereby, a weight of magnetic material secured to said frame, and electrical means acting upon said weight for returning the pendulum to its normal position.

33. In a scale, load-offsetting means comprising a pendulum, a frame of non-magnetic material carried thereby, a weight of magnetic material secured to said frame, and electrical means acting upon said weight for returning the pendulum to its normal position including a solenoid arranged adjacent said weight.

34. In a scale, load-offsetting means comprising a pendulum, a frame of non-magnetic material carried thereby, a weight of magnetic material secured to said frame, and electrical means acting upon said weight for returning the pendulum to its normal position including a solenoid arranged adjacent said weight, and means for energizing said solenoid set in operaton by movement of the pedulum.

35. In a scale, load-offsettng means comprising a pendulum, a frame of non-magnetic material carried thereby, a weight of magnetic material secured to said frame, and electrical means acting upon said weight for returning the pendulum to its normal position including a solenoid arranged to surround said weight.

36. In a scale, load-offsetting means comprising a pendulum, a frame of non-magnetic material carried thereby, a weight of magnetic material secured to said frame, and electrical means acting upon said weight for returning the pendulum to its normal position including a solenoid arranged to surround said weight, and means for energizing said solenoid set in operation by movement of the pendulum.

37. In a scale, load-offsetting means comprising a pendulum pivoted intermediate its ends, a weight carried by one arm of the pendulum adapted to be moved from its normal position in counter-balancing a load, means associated with said weight for returning the pendulum to its normal position, indicating mechanism, and means carried by the opposite arm of said pendulum for actuating the indicating mechanism upon such return movement.

38. In a scale, load-offsetting means comprising a pendulum pivoted intermediate its ends, a weight carried by one arm of the pendulum adapted to be moved from its normal position in counter-balancing a load, electrically-actuated means for returning the pendulum to its normal position, indicating mechanism, and means carried by the opposite arm of said pendulum for actuating the indicating mechanism upon such return movement.

39. In a scale, load-offsetting means including a pendulum pivoted intermediate its ends, a weighted frame carried by one arm of the pendulum, electrical means associated with said weighted frame for returning the same to its normal position, indicating mechanism, and means carried by the other arm of the pendulum for actuating the indicating mechanism.

40. In a scale, load-offsetting means including a pendulum pivoted intermediate its ends, a frame of non-magnetic material having a weight of magnetic material secured thereto carried by one arm of the pendulum, electrical means associated with said weighted frame for returning the same to its normal position, indicating mechanism, and means carried by the other arm of the pendulum for actuating the indicating mechanism.

41. In a scale, load-offsetting means including a pendulum pivoted intermediate its ends, a weighted frame carried by one arm of the pendulum, electrical means including a solenoid associated with said weighted frame for returning the same to its normal position, indicating mechanism, and means carried by the other arm of the pendulum for actuating the indicating mechanism.

42. In a scale, load-offsetting mechanism comprising a movable fulcrum-rod pivoted adjacent one end to a fixed portion of the scale, a pivotally supported pendulum pivoted intermediate its ends to the free end of the fulcrum-rod, a weight carried by one arm of said pendulum, and connections for rocking said pendulum upon imposition of a load pivotally connected to the other arm of the pendulum.

43. In a scale, load-offsetting mechanism comprising a movable fulcrum-rod pivoted adjacent one end to a fixed portion of the scale, a pivotally supported pendulum pivoted intermediate its ends to the free end of the fulcrum-rod, a weighted frame carried by one arm of said pendulum, and connections for rocking said pendulum upon imposition of a load pivotally connected to the other arm of the pendulum adjacent the pivot point of the pendulum.

44. In a scale, load-offsetting mechanism comprising a movable fulcrum-rod pivoted adjacent one end to a fixed portion of the scale, a pendulum pivoted intermediate its ends to the free end of the fulcrum-rod, a weight carried by one arm of said pendulum, and connections for rocking said pendulum upon imposition of a load including a rocker frame mounted upon a fixed portion of the scale, an arm carried by said rocker frame pivotally connected to the arm of the pendulum on the opposite side of the pivot point, and means for rocking said rocker frame.

45. In a scale, load-offsetting mechanism comprising a rocker frame, connections for rocking said rocker frame upon the imposition of a load placed upon the platform of the scale, an arm secured to said rocker frame, a load-offsetting pendulum pivoted intermediate its ends, means pivotally connecting one arm of the pendulum with the arm secured to the rocker frame, and a weight carried by the opposite arm of the pendulum.

46. In a scale, load-offsetting mechanism comprising a rocker frame, connections for rocking said rocker frame upon the imposition of a load placed upon the platform of the scale, an arm secured to said rocker frame, a movable fulcrum-rod, a pendulum pivoted intermediate its ends to one end of the movable fulcrum-rod, means for pivotally connecting the opposite end of the fulcrum-rod to a fixed portion of the scale, means pivotally connecting one arm of the pendulum with the arm secured to the rocker frame, and a weight carried by the opposite arm of the pendulum.

47. In a scale, weighing mechanism, a shaft rotated upon movement of the weighing mechanism, indicating mechanism, and electrically-operated clutch connections arranged between the indicating mechanism and said shaft and actuated by movement of said weighing mechanism whereby the indicating mechanism is actuated upon certain movements of said shaft.

48. In a scale, weighing mechanism, a shaft rotated upon movement of the weighing mechanism, indicating mechanism, and a magnetic clutch arranged between the indicating mechanism and said shaft and actuated by movement of said weighing mechanism whereby the indicating mechanism is actuated upon certain movements of said shaft.

49. In a scale, weighing mechanism including a pendulum, a shaft adapted to be rotated upon movement of the pendulum, indicating mechanism including a second shaft arranged adjacent the first-mentioned shaft, and automatic connecting means arranged between the two shafts whereby the second shaft is rotated in conjunction with the first-mentioned shaft during certain movements of the latter.

50. In a scale, weighing mechanism including a pendulum, a shaft adapted to be rotated upon movement of the pendulum, indicating mechanism including a second shaft arranged adjacent the first-mentioned shaft, and electrically-actuated means arranged between the two shafts whereby the second shaft is rotated in conjunction with the first-mentioned shaft during certain movements of the latter.

51. In a scale, weighing mechanism including a pendulum, a shaft adapted to be rotated upon movement of the pendulum, indicating mechanism including a second shaft arranged adjacent the first-mentioned shaft, a magnetic clutch arranged between the two shafts whereby the second shaft is rotated in conjunction with the first-mentioned shaft during certain movements of the latter.

52. In a scale, and in combination with the weighing mechanism thereof, a shaft adapted to be rotated upon movement of the weighing mechanism, indicating mechanism including a second shaft arranged adjacent the first-mentioned shaft, a disk of magnetic material carried by the first-mentioned shaft, a magnetic clutch carried by the said second-mentioned shaft, and means for energizing said magnetic clutch to attract said disk to rotate the second shaft in conjunction with the first-mentioned shaft while said disk is so clutched.

53. In a scale, and in combination with the weighing mechanism thereof, a shaft adapted to be rotated upon movement of the weighing mechanism, indicating mechanism including a second shaft arranged adjacent the first-mentioned shaft, a disk of non-magnetic material fixedly secured upon the first-mentioned shaft, a disk of magnetic material loosely connected with the first-mentioned disk, a magnetic clutch carried by the said second-mentioned shaft, and means for energizing said magnetic clutch to attract the disk of magnetic material to rotate the second shaft in conjunction with the first-mentioned shaft while said disk is so clutched.

54. In a scale, weighing mechanism, automatic timing mechanism including a movable rod, electrical connections and mechanism for advancing said rod arranged to be energized upon movement of the weighing mechanism, a circuit-breaking switch arranged to be tripped upon the advance movement of the rod whereby said electrical mechanism is deënergized, indicating means, and means controlled by the timing mechanism for connecting the indicating mechanism with the weighing mechanism.

55. In a scale, weighing mechanism, aumatic timing mechanism including a movable rod, electrical connections and mechanism for advancing said rod arranged to be energized upon movement of the weighing mechanism, a circuit-breaking switch arranged to be tripped upon the advance movement of the rod, a magnetic timer for gradually returning the movable rod to its normal position after the tripping of the circuit-breaking switch, indicating means, and means controlled by the timing mechanism for connecting the indicating mechanism with the weighing mechanism.

56. In a scale, weighing mechanism, automatic timing mechanism including a movable rod, electrical connections and mechanism for advancing said rod arranged to be energized upon movement of the weighing mechanism, a circuit-breaking switch arranged to be tripped upon the advance movement of the rod whereby said electrical mechanism is deënergized, a magnetic timer for gradually returning the movable rod to its normal position after the tripping of the circuit-breaking switch, indicating means, and means controlled by the timing mechanism for connecting the indicating mechanism with the weighing mechanism.

57. In a scale, weighing mechanism, automatic timing mechanism including a movable rod, electrical connections and mechanism for advancing said rod actuated upon movement of the weighing mechanism, a circuit-breaking switch arranged to be tripped upon the advance movement of the rod, a mechanical timer for gradually returning the movable rod to its normal position after the tripping of the circuit-breaking switch, said mechanical timer including an oscillatory pendulum having a weight of magnetic material, and electrical means associated with said weight to stop the oscillations of said pendulum after a predetermined time.

58. In a scale, weighing mechanism, automatic timing mechanism including a movable rod, electrical connections and mechanism for advancing said rod actuated upon movement of the weighing mechanism, a circuit-breaking switch arranged to be tripped upon the advance movement of the rod, a mechanical timer for gradually returning the movable rod to its normal position after the tripping of the circuit-breaking switch, said mechanical timer including an oscillatory pendulum having a weight of magnetic material, and a magnet arranged adjacent the pendulum weight and adapted when energized to stop the oscillations of said pendulum.

59. In a scale, a pendulum having a weight of magnetic material, means for moving the pendulum, and electrical means associated with said weight adapted when energized to return said pendulum to its normal position, said means being set in operation by the movement of the pendulum.

60. In a scale, a pendulum having a weight of magnetic material, means for moving the pendulum, and electro-magnetic means associated with said weight adapted when energized to return said pendulum to its normal position, said means being set in operation by the movement of the pendulum.

61. In a scale, a pendulum having a weight of magnetic material, means for moving the pendulum, and electrical means associated with said weight adapted when energized to return said pendulum to its normal position, and means for energizing said electrical means a predetermined time after the initial movement of the pendulum.

62. In a scale, a pendulum having a weight of magnetic material, means for moving the pendulum, and electro-magnetic means associated with said weight adapted when energized to return said pendulum to its normal position, and time-controlled means for energizing said electro-magnetic means set in operation by the initial movement of the pendulum.

63. In a scale, the combination of weighing mechanism, a switch-throwing mechanism, means for setting the same in operation upon movement of the weighing mechanism, indicating mechanism, means for connecting the indicating mechanism with the weighing mechanism for operation from the latter, illuminating means associated with the scale, and electric circuits and mechanisms arranged to be successively closed by the switch-throwing mechanism to actuate said connecting means and said illuminating means.

64. In a scale, the combination of weighing mechanism, a switch-throwing mechanism, means for setting the same in operation upon movement of the weighing mechanism, indicating mechanism, means for connecting the indicating mechanism with the weighing mechanism for operation from the latter, illuminating means associated with the scale, and a plurality of electric circuits and mechanisms arranged to be successively closed by the switch-throwing mechanism to first actuate said connecting means and then said illuminating means.

SAMUEL G. CRANE.

Witnesses:
H. S. BERGEN,
C. WM. FESSENDEN.